Dec. 21, 1954     G. E. HANEY ET AL     2,697,564
HAND-HELD FISHING LINE REEL FOR CASTING RODS
Filed Dec. 7, 1950
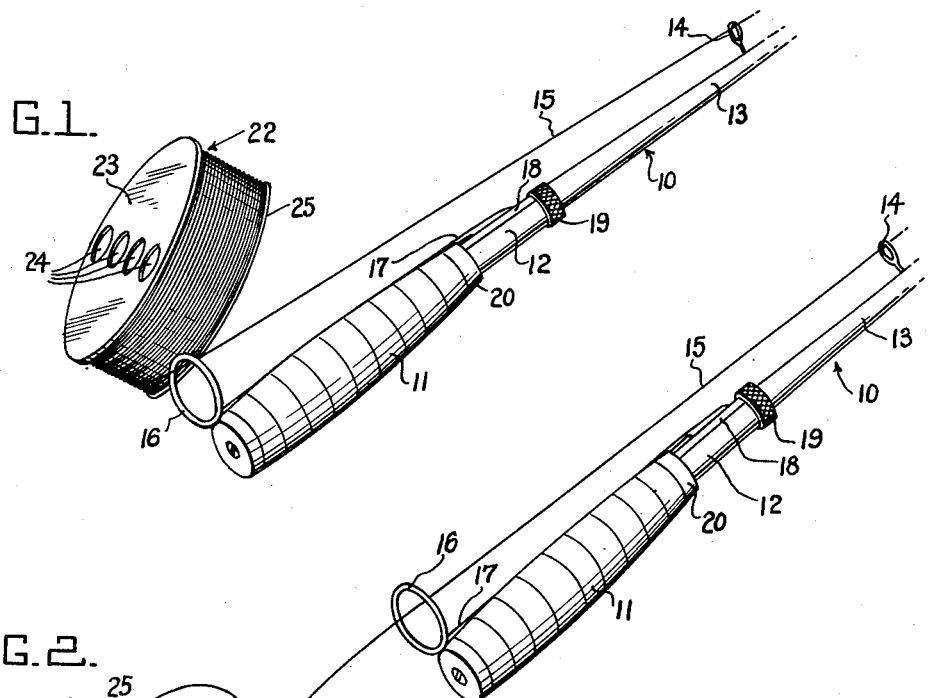
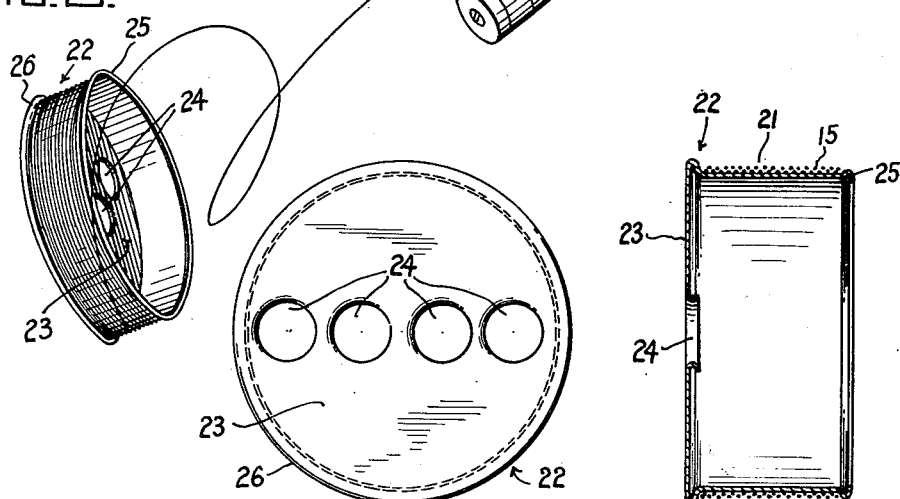
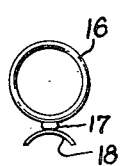 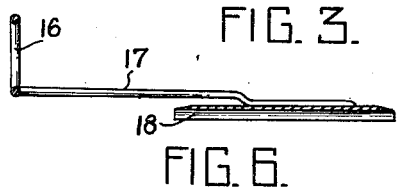 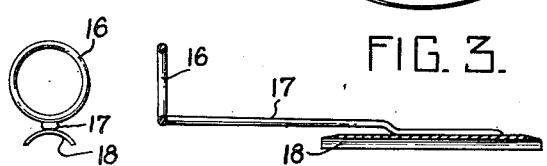 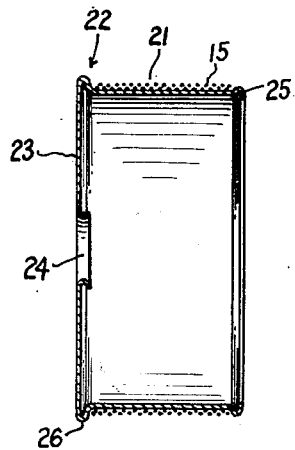
INVENTORS
George E. Haney
Glen N. Krouse
BY W. S. McDowell
ATTORNEY

United States Patent Office 2,697,564
Patented Dec. 21, 1954

2,697,564

HAND-HELD FISHING LINE REEL FOR CASTING RODS

George E. Haney and Glen N. Krouse, Columbus, Ohio

Application December 7, 1950, Serial No. 199,677

2 Claims. (Cl. 242—96)

The present invention relates generally to fishing tackle, and has particular reference to an improved hand-held, line-receiving reel and rod combination wherein the reel and rod are physically detached and held in separate hands during casting and retrieving of a fishing line or bait, and wherein an associated fishing line may be freely stripped off one end of the reel upon casting movement of the rod when the axis of the reel is positioned in substantial parallelism to the axis of the rod.

In the past, bait-casting reels have been of two general types, namely: (1) where the reel embodied a rotatable spool or spindle whose axis was positioned in substantially perpendicular transverse relation to the axis of the rod to permit an associated fishing line to be wound about or unwound from the spool upon rotation of the latter; and (2) where the reel member comprised a spool or line-wrapping member having its longitudinal axis positioned in substantially parallel relation to the longitudinal axis of the rod to permit an associated fishing line to be stripped freely off one end of the line-wrapping member of the reel upon casting movement of the rod; this latter type of reel being commonly referred to as a "spinning reel". While the so-called spinning reel has, to a great extent, eliminated the common difficulty with backlash encountered by fishermen when using the ordinary rotatable spool type of reel, and has enabled the fisherman to improve the distance obtained in casting, the primary objection to the ordinary type of spinning reel stems from the relatively high cost of the reel, as well as the relatively delicate nature of the construction of the various movable parts of such reel.

It follows, therefore, that it is an object of the present invention to provide a line-receiving casting reel by which the normal difficulties associated with the ordinary rotatable spool-type reel are eliminated, and which makes use of the same stripping action associated with the ordinary type of spinning reel, but which may be produced at a fraction of the cost of the ordinary spinning reel and does not require any special type of rod, weight of line, or type of bait for efficient operation.

Another object of the present invention is to provide a hand-held, line-receiving reel which comprises a single piece body devoid of movable parts, and which is adapted to be held in casting operations in physically detached relation to an associated casting rod in one hand of a person holding the casting rod in the opposite hand.

Yet another object of this invention is to provide a hand-held, physically detached, line-receiving reel for use in combination with an associated casting rod, and wherein the reel comprises a relatively simple spool-type body formed on its outer peripheral surface with a line-wrapping region and at one end with a series of finger-receiving openings by which the spool body may be held without obstruction to the line-wrapping region thereof and in a manner to enable the fisherman to position the axis of the spool body in substantially parallel relation to the axis of the associated casting rod to permit the line to be stripped freely from the spool during casting movement of the rod, or to position the axis of the spool body in substantially perpendicular relation to the axis of the associated fishing rod to enable an associated line to be wound about the line-receiving region of the spool by a simple circular wrist motion employed in retrieving the bait and/or a hooked fish after casting.

For a further and more detailed understanding of the present invention, and the various additional objects and advantages derived therefrom, reference is made to the following description and the accompanying drawing, wherein:

Fig. 1 is a perspective view of our improved hand-held, line-receiving reel in operative association with a casting rod, and wherein the reel occupies a position to retrieve an associated fishing line;

Fig. 2 is a similar view showing the reel in position to permit casting and free stripping of the associated fishing line from the reel;

Fig. 3 is an end elevational view of the reel;

Fig. 4 is a medial longitudinal vertical sectional view taken through the reel;

Fig. 5 is an end elevational view of an eyelet guide used in combination with the present hand-held reel; and Fig. 6 is a vertical sectional view taken through the auxiliary eyelet guide shown in Fig. 5.

With reference to the drawing, the numeral 10 designates generally a casting rod of any suitable construction having a handle 11, reel-seating region 12, an elongated shaft portion 13, and one or more eyelet guides 14 through which an associated fishing line 15 is trained longitudinally of the rod 10.

In accordance with the present invention, a supplemental line guide is positioned adjacent the butt end of the handle of the rod. As illustrated in Figs. 1, 2, 5, and 6, the supplemental line guide comprises a circular eyelet 16 which is arranged in substantially longitudinal alignment with the eyelet guides 14 of the rod and which is disposed in laterally offset relation to the butt end of the handle 11. The eyelet portion 16 is carried upon an elongated strip 17 which extends longitudinally forwardly of the handle 11 and terminates at its forward end in an arcuately bent attaching bracket 18 which is adapted to conform to the configuration of the reel seat region 12 of the rod and to be detachably held thereon, as by means of the ordinary reel-retaining collars 19 and 20 associated with the rod. Alternatively, the supplemental line guide 16 may be secured to the handle 11 in any suitable manner to dispose the same in laterally offset relation to the butt end of the handle, such as by taping the strip 17 to the handle, or by securing the eyelet 16 to the butt end of the handle by any suitable bracket attachment, it being understood that the specific anchoring means for the supplemental guide does not per se constitute a part of the present invention.

The fishing line 15 is carried by and wound about a substantially cylindrical winding region 21 formed on a hand-held, line-receiving spool, generally designated by the numeral 22. The spool 22 may be formed of any suitable material, preferably of a lightweight nature, such as aluminum or one of the suitable synthetic resins, and in addition to the annular side wall defining the wrapping region 21, is formed to provide an end wall 23 through which extends a plurality of relatively spaced finger-receiving openings 24. The openings 24 enable the spool to be grasped and held by inserting the four fingers of one hand through the openings, leaving the thumb of the hand free to control the movement of the line 15 relative to the spool. The opposite end of the spool 22 is open and is provided with a beaded circular lip 25 having a smooth outer surface which permits free stripping of the line 15 from the spool when the axis of the latter is positioned in substantially longitudinal alignment with the fishing rod 10. Advantageously, the region of the spool 22 joining the winding region 21 with the end wall 23 is formed to constitute a relatively diametrically enlarged flange 26 which serves to prevent accidental withdrawal of the fishing line from the closed end of the spool.

In operation, the present rod and reel assembly follows closely the action of the ordinary spinning rod and reel in that the same provides for the free stripping and uncoiling of the fishing line from the open end of the spool when the spool is positioned so as to have its axis in substantial parallelism with respect to the axis of the rod 10. For right-handed fishermen, the spool 22 is preferably held in the left hand with the four fingers of the left hand inserted through the openings 24, while the handle 11 of the rod is grasped in the right hand in the ordinary manner to effect casting movement of the rod. The free end portion of the line 15 is trained from the spool first through the supplemental eyelet guide 16 and thence outwardly through the eyelet guides 14 of the rod, and is secured to any suitable casting bait or lure. Prior to casting operations, the hand of the fisherman grasping the handle 11 of the rod is placed so that the thumb of the hand may clamp the line 15 against the handle portion of the rod to prevent relative movement of the line. By the same token, the other hand of the fisherman is positioned so that the thumb may be used to securely clamp the line about the winding region 21 of the spool to prevent accidental withdrawal of the line prior to casting. When it is desired to cast the bait, the spool is positioned so as to have its axis disposed in substantial alignment with the line of cast, and the rod is drawn backwardly and whipped forwardly by the usual arm and wrist movement employed in bait casting. Simultaneously with the forward whipping of the rod, the thumbs of the two hands are freed from the line to permit the same to be stripped off the open end of the spool 22, the thumb of the hand holding the rod being used to stop the movement of the line at the desired point of travel, preferably as the bait closely approaches or strikes the water.

In retrieving the bait or a hooked fish after casting, the spool 22 is brought up relatively close to the supplemental eyelet 16 and is rotated by a circular wrist motion with the axis of the spool disposed in substantially perpendicular relation to the axis of the rod to wind the line 15 onto the winding region 21 of the spool. The location of the supplemental line guide 16 adjacent the butt end of the handle enables the line 15 to be rewound or paid out without fear of entangling the same with the butt end of the rod 10, and while the supplemental eyelet 16 is not entirely essential to the operation of the present hand-held reel, the same is deemed to be highly advantageous, particularly in the rewinding operation, as the supplemental eyelet prevents entanglement of the fishing line with the handle portion of the rod. Also, it will be understood that other suitable types of eyelet guides may be employed in this capacity such as a split-ring guide which provides for the detachment of the line from the guide when desired.

In view of the foregoing, it will be seen that the present invention provides a relatively simple, yet highly efficient rod and reel combination, wherein the rod and reel members are physically detached from one another and are designed to be held in the separate hands of the fisherman. It should be borne in mind that while the foregoing description calls for the holding of the rod in the right hand and the reel in the left, this procedure may be reversed, if so desired, by fishermen who are accustomed to casting with the left hand. Reels or spools formed in accordance with the present invention may be formed in any suitable manner from relatively inexpensive material, and are preferably formed with a diameter somewhat larger than the diameter of the ordinary casting reel to accommodate a considerable length of line per revolution about the line-wrapping region of the spool, whereby to decrease the number of coils of line carried on the spool per given length of line and thereby enable the line to be more easily dried in place upon the spool.

The present rod and reel assembly is characterized by a novel and intriguing action for the fisherman, and it has been found through actual experiments that the ordinary fisherman may, in a relatively short practice period, become particularly adept in handling the present combination and in obtaining distances in casts heretofore unrealized with the ordinary rotating spool or spinning types of reels. This is due to the fact that there is substantially no resistance offered to the unwinding of the fishing line from the spool during a normal cast. Further, due to the fact that the spool is held independently of the rod, the fishing line may be rewound onto the spool in either as even or an uneven action by varying the motion of the wrist in retrieving. An uneven rewinding movement results in a jerking or darting action of the bait in its retrieving movement, thus providing additional attraction for the ordinary game fish.

In the foregoing specification, the term "casting rod" is intended to include in its definition fishing rods generally of the type commonly referred to as casting rods, fly rods and spinning rods, and generally any type of fishing rod wherein a lure or bait is cast upon movement of the rod.

While a single preferred embodiment of the invention has been described in detail, it will be manifest that various modifications may be resorted to without departing from the spirit of the invention or the scope of the following claims.

We claim:

1. A fishing line casting reel of the spinning type, adapted to be held in one hand of an operator during manipulation of an associated line casting rod with the other hand and consisting of a hollow, generally cylindrical, spool-like body of relatively short axial length as compared with the diameter thereof and being formed with a generally cylindrical peripheral outer surface for the wrapped reception of a fishing line; a flat disk-like end wall carried by and closing one end of said body, the peripheral portion of said end wall defining with the said one end of said body a continuous line-retaining flange of larger diameter than that defined by the outer surface of said body, the end of said body opposite said end wall being substantially unobstructed to permit a fishing line wrapped about the outer surface of said body to be freely stripped therefrom in a direction substantially parallel to the axis of said body during casting operations; and finger-grasping means provided on said end wall and disposed substantially flush thereto, whereby to receive a plurality of the fingers of an operator without obstructing the line-wrapping outer surface of said body, and said end wall possessing a diameter such as to permit said last-named means to be firmly held by the fingers of one hand of an operator while leaving the thumb of the same hand free for braking contact with a line wrapped about the outer surface of said body.

2. A fishing line casting reel as defined in claim 1, wherein said finger-grasping means comprises a plurality of diametrically spaced openings formed in said end wall through which the fingers of a hand may be inserted.

References Cited in the file of this patent

UNITED STATES PATENTS

| Number | Name | Date |
|---|---|---|
| 252,008 | Andrews | Jan. 10, 1882 |
| 387,541 | Roe | Aug. 7, 1888 |
| 1,013,347 | Wetzel | Jan. 2, 1912 |
| 1,058,925 | Toegel | Apr. 15, 1913 |
| 1,256,278 | Takeuchi | Feb. 12, 1918 |
| 1,408,261 | Brookhart | Feb. 28, 1922 |
| 1,625,988 | Dice | Apr. 26, 1927 |
| 2,250,281 | Sundstrand | July 22, 1941 |
| 2,537,613 | Allen | Jan. 9, 1951 |
| 2,603,429 | Jaworowski et al. | July 15, 1952 |